United States Patent
Johnson et al.

(10) Patent No.: US 6,569,022 B2
(45) Date of Patent: May 27, 2003

(54) SELF-SYNCHRONIZING TAP DRIVER FOR RIGID TAPPING

(75) Inventors: Allan S. Johnson, Harrison, ID (US); Mark F. Johnson, Harrison, ID (US)

(73) Assignee: Tapmatic, Inc., Post Falls, ID (US)

(*) Notice: Subject to any disclaimer, the term of this patent is extended or adjusted under 35 U.S.C. 154(b) by 8 days.

(21) Appl. No.: 10/027,816

(22) Filed: Dec. 19, 2001

(65) Prior Publication Data

US 2002/0094876 A1 Jul. 18, 2002

Related U.S. Application Data

(63) Continuation-in-part of application No. 09/629,490, filed on Jul. 31, 2000, now Pat. No. 6,348,003.

(51) Int. Cl.[7] .............................. B21D 53/24; B21K 1/64

(52) U.S. Cl. .................... 470/96; 470/103; 470/198; 408/238; 408/239 R

(58) Field of Search .................... 470/96, 103, 198; 408/146, 238, 239 R

(56) References Cited

U.S. PATENT DOCUMENTS

| | | | |
|---|---|---|---|
| 4,028,763 A | 6/1977 | Jenner | |
| 4,072,084 A | 2/1978 | Knight, Jr. et al. | |
| 4,080,090 A | 3/1978 | Kern | |
| 4,274,768 A | 6/1981 | Kato | |
| 4,284,374 A | 8/1981 | Senzaki | |
| 4,449,868 A * | 5/1984 | Steinsberger et al. | 408/138 |
| 4,514,115 A | 4/1985 | Akashi | |
| 5,054,974 A | 10/1991 | Wellach | |
| 5,882,015 A * | 3/1999 | McPherson | 279/16 |
| 5,915,892 A | 6/1999 | Glimpel et al. | |
| 6,257,809 B1 * | 7/2001 | Silken | 408/129 |
| 6,348,003 B1 * | 2/2002 | Johnson et al. | 470/96 |

* cited by examiner

Primary Examiner—Ed Tolan
(74) Attorney, Agent, or Firm—Wells St. John P.S.

(57) ABSTRACT

Disclosed is a tap driver for rigid tapping, which includes predetermined tension and compression factors to self-synchronize the tap driver. In the preferred embodiment, the tap driver includes helical coils imparted in the tap driver body which allow the attachment body to synchronize axially in response to a force of a predetermined magnitude imparted on the tap. An additional embodiment of this invention provides such a tap driver body wherein the body allows for lateral flexure and movement to compensate for feed error and location error.

10 Claims, 6 Drawing Sheets

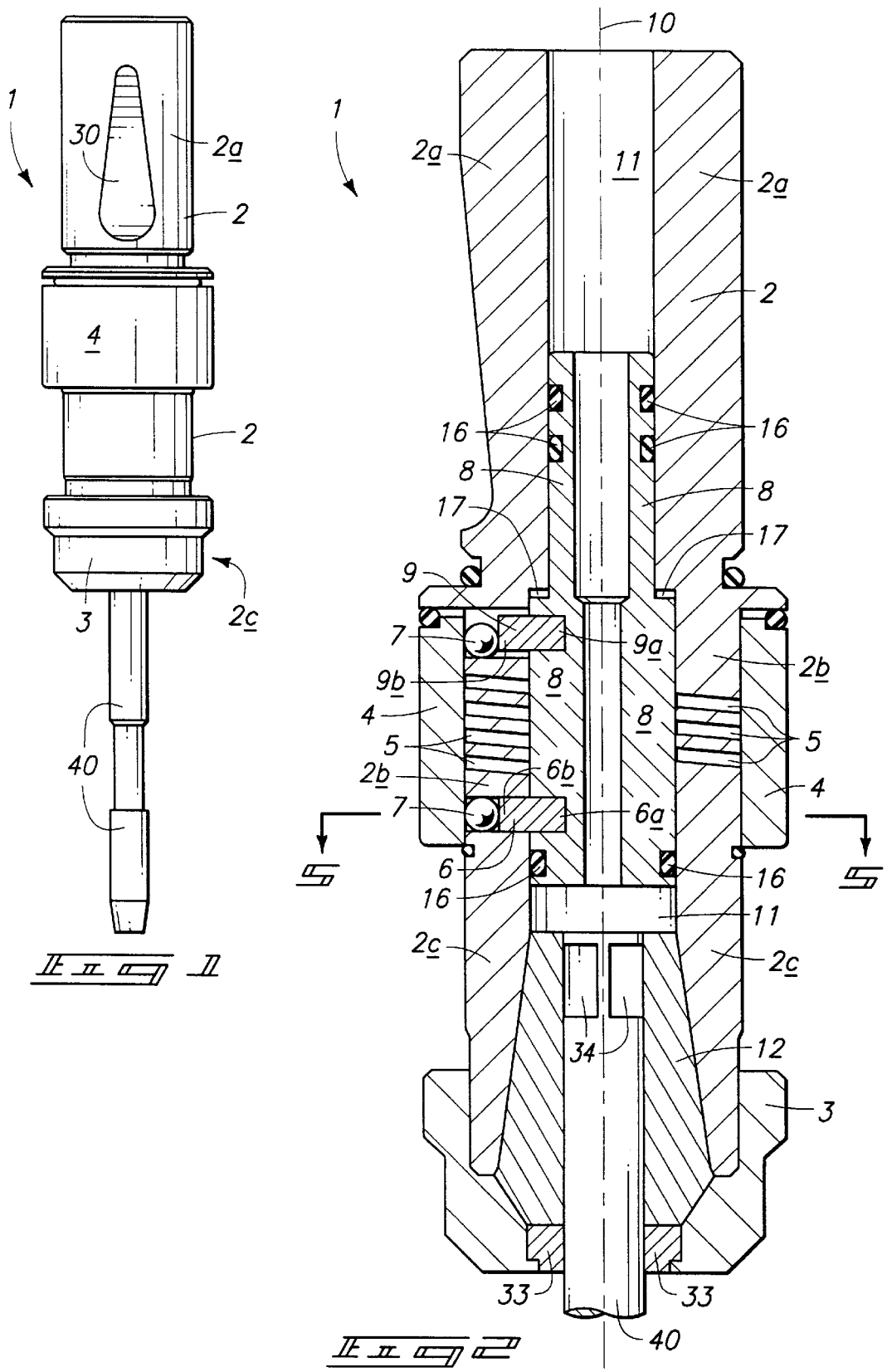

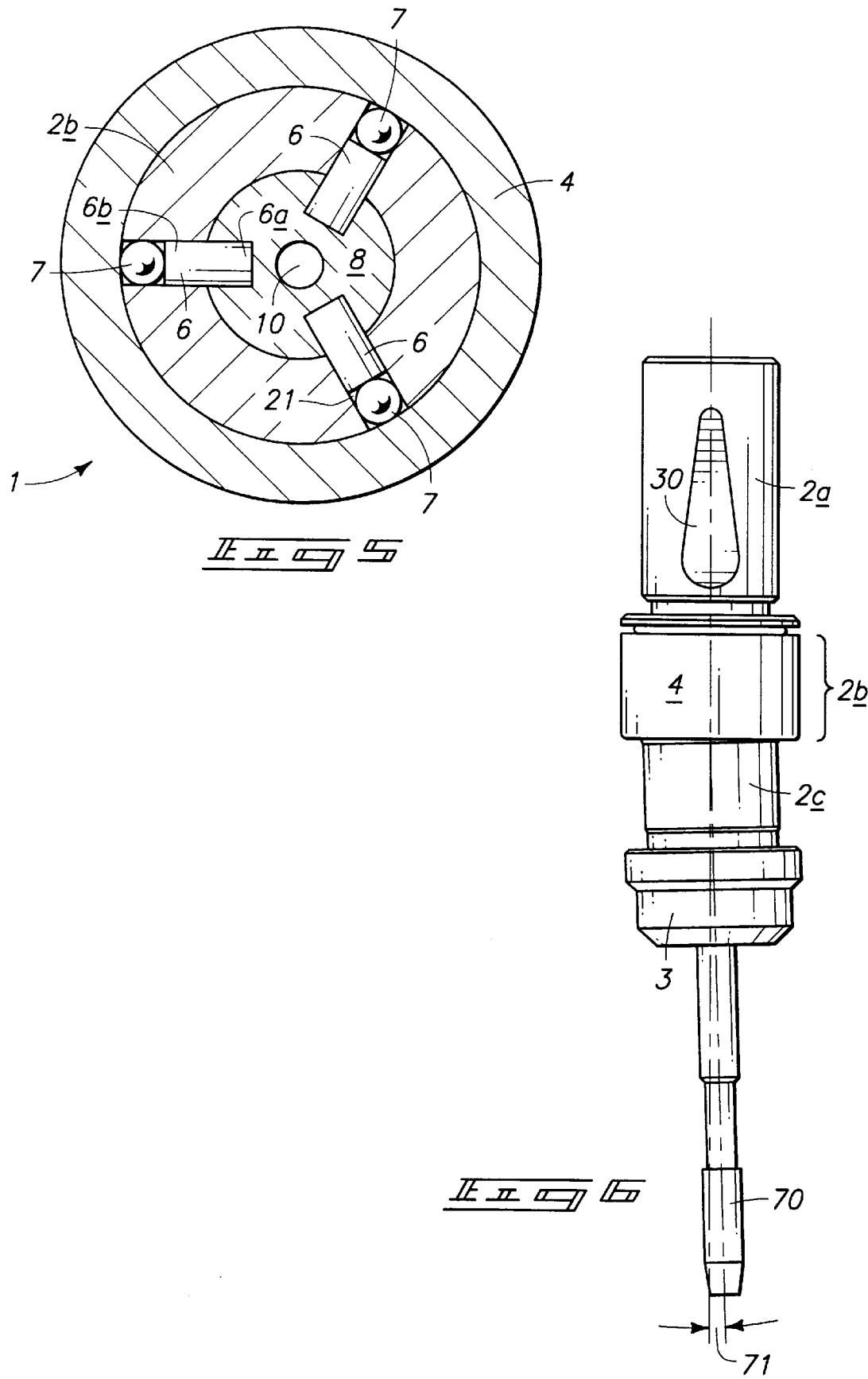

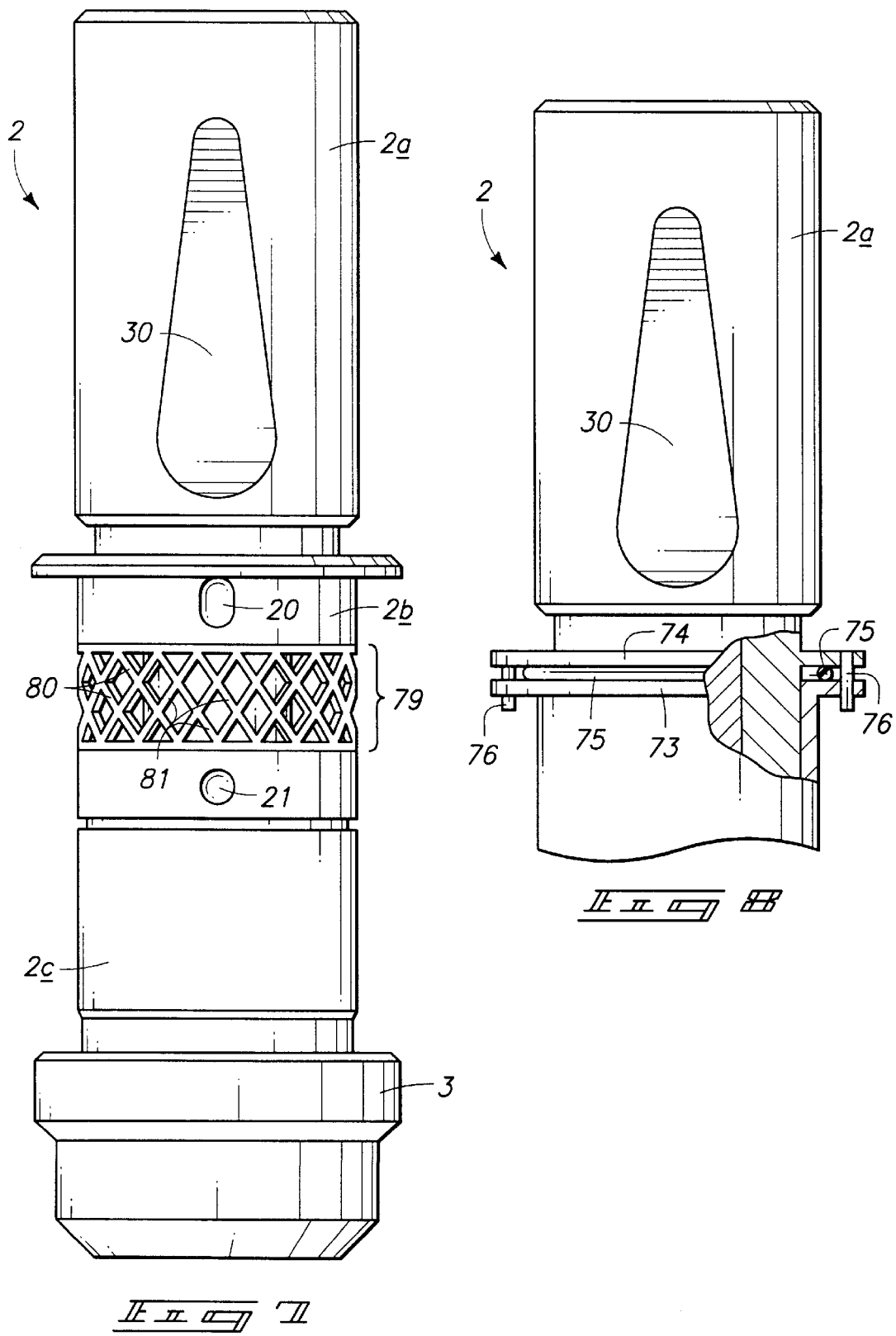

SELF-SYNCHRONIZING TAP DRIVER FOR RIGID TAPPING

CROSS REFERENCE TO RELATED APPLICATION

This application is a continuation in part of U.S. patent application Ser. No. 09/629,490 now U.S. Pat. No. 6,348,003 which was filed on Jul. 31, 2000 and which is incorporated by reference herein.

TECHNICAL FIELD

This invention pertains to a self-synchronizing and self-adjusting tap driver for rigid tapping.

BACKGROUND OF THE INVENTION

In machining metallic work pieces, an apparatus called a tap is used to create internally threaded holes for receiving screws in the metallic work pieces. The tap itself is a tool with external cutting threads. In order to create the internally threaded hole in the work piece, the tap is rotated and driven into the work piece to the desired hole depth, and then reverse rotated and retracted from the work piece.

The tap is held by a tap driver, and the tap driver is held or secured within a machine which provides the forward and reverse rotation as well as the forward and reverse drive.

In creating the internally threaded hole, the tap driver is first rotated and driven into the base material or metal to the desired depth. Once the tap reaches the desired depth, the rotation of the tap driver and the tap is reversed and the tap is retracted from the base material.

In order to create the best internally threaded hole, the tap should be simultaneously advanced and rotated at precisely correlated rates of rotation and forward movement for a given tap pitch. By way of example, a one-quarter-twenty tap should be advanced into the work piece one inch for every twenty revolutions, or 0.05 inch for each revolution. In typical rigid tapping, the driver machines provide the synchronization of the spindle rotation and feed advance to match the tap pitch.

During the creation of a tap hole, the machine spindle goes through several stages, namely driving the rotating tap into the tap hole, slowing the forward drive or feed rate and the rotation until the tap comes to a stop in the work piece, reversing the direction of the rotation and accelerating or increasing the reverse rate of rotation to match the desired tap pitch as the tap is retracted.

It is appreciated by those of ordinary skill in the art that during the changes in rotation speed, the feed advance of the tap must be adjusted or correlated to precisely match the tap pitch. However, in practice it is very difficult to precisely match the rotation, drive and tap pitch and there are small errors that occur in the synchronization of the rotation speed and the feed rate during the deceleration or slowing down phase, and during the reverse rotation acceleration phase.

In typical prior art, tapping drivers are generally solid in that they have no real ability to compensate for discrepancies between the feed of the tap and the feed advance of the machine, but instead merely directly transfer the rotation and drive of the tapping machine.

With solid tap holders, even very small errors in the synchronization will apply a significant axial force on the tap, creating premature wear to the tap and negatively affecting the thread quality produced by the tap.

In machining numerous internally threaded apertures, one machine may be used to drill pilot holes into which the taps are driven, while a different machine may be used for the actual tapping. This may lead to slight positioning errors wherein the tap for instance is not exactly aligned with the pilot hole, but instead may be one or two thousandths of an inch off.

It will be appreciated by those of ordinary skill in the art that there is a need for a tap driver which has some limited flexure for the location errors associated with locating the tap with respect to the desired tap hole location.

BRIEF DESCRIPTION OF THE DRAWINGS

Preferred embodiments of the invention are described below with reference to the following accompanying drawings.

FIG. 1 is an elevation view of an embodiment of this invention showing a tap driver with a tap device therein;

FIG. 2 is an elevation cross-sectional view of an embodiment of this invention showing a tap driver with a flexible area machined with helical coils between the shank portion and the chuck portion;

FIG. 5 is a top cross-sectional view of the embodiment of the invention shown in FIG. 4;

FIG. 6 is an elevation view of an embodiment of the invention, illustrating lateral flexure provided by an embodiment of this invention;

FIG. 7 is an elevation view of another embodiment of a tap driver body which may be used in connection with this invention;

FIG. 8 is an elevation partial view of another embodiment of a tap driver body which may be used in an embodiment of this invention.

DETAILED DESCRIPTION OF THE PREFERRED EMBODIMENTS

Figure 3:
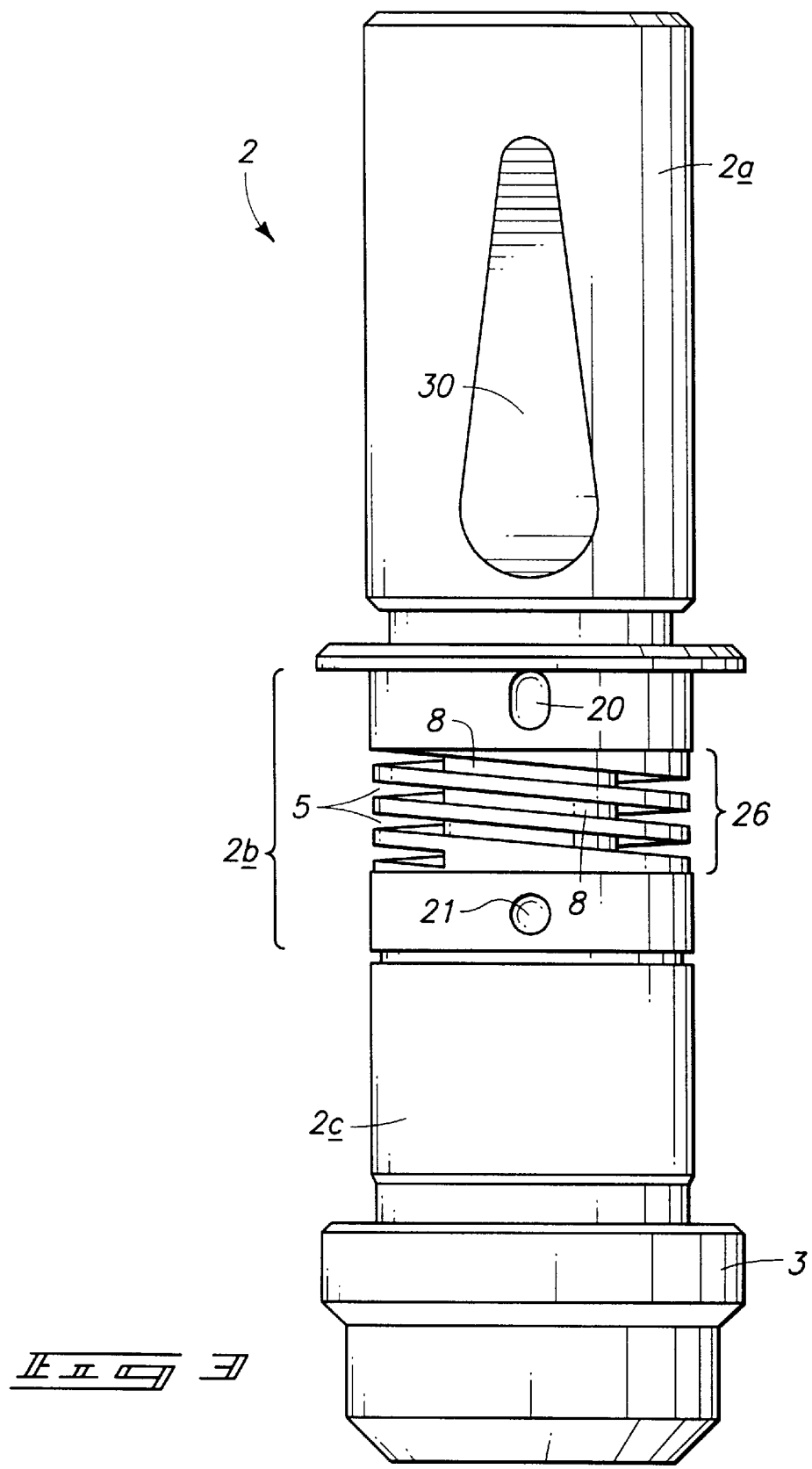
FIG. 3 is an elevation view of a tap driver body which may be used in an embodiment of this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The tap driver provided by this invention may be used in combination with any one of a different machines or applications, with no one in particular being required to practice this invention. It may be used for instance in combination with a machining center which has rigid tapping capability.

FIG. 1 is an elevation view of an embodiment of this invention showing a tap driver attachment with a tap device therein, illustrating tapping attachment 1, tap driver body 2, shank portion 2a of tap driver body 2, chuck portion 2c of tap driver body 2, tap 40, collet nut 3, tap body sleeve 4, and shank flat 30 to attach to a machine spindle or into another shank which fits into a machine spindle. The shank flat 30 facilitates the securement of the tap driver to its source of rotation or ultimately to the machine spindle.

FIG. 2 is a cross-sectional elevation view of an embodiment of this invention which shows the tapping attachment 1, tap driver body 2, with tap driver body shank portion 2a, tap driver body central portion 2b, and tap driver body chuck section 2c. In the central portion 2b of the tap driver body 2, helical coils 5 have been cut into the body around the circumference to provide a spring or tension and compression properties (and limited lateral flexure) different or dissimilar from that in the shank portion 2a and chuck portion 2c.

The helical coils can be precisely cut to provide the desired flexure, tension and compression necessary to allow the attachment body to self synchronize to forces imparted on the tap during tapping. Compression occurs by an upward force on the guide bushing 8 contained within tap driver body axial aperture 11. When an excess force is incurred, it will be transmitted through guide bushing 8 to first drive pin 6. First drive pin 6 then imparts or transfers said axial force to the helical coils 5 in central portion 2b to cause compression of the central portion 2b of the tap driver body 2.

Compression gaps 17 provide space for, and limit, the movement of guide bushing 8 during compression of center portion 2b. Compression gaps 17 are shown larger than they actually would be for illustrative purposes only. In a typical tapping attachment, the compression gaps may only need to be one-half (½) of a millimeter in order to provide the sufficient movement for the desired synchronization.

The helical coils 5 may be cut into tap driver body 2 accurately and precisely to create the desired spring characteristics to equate the central portion 2b of tap driver body 2 to a thirty pound spring. The helical coils 5 may be machined into the central body portion by Helical Products, Inc. The extension and compression rate is approximately eleven hundred sixty seven (1167) pounds per inch reference, the spring extension and compression of thirty one-thousandths inch maximum with a reaction force of thirty five pounds, plus or minus ten percent. The preferred permitted lateral translation of spring is three one-thousandths of an inch. The preferred material out of which the spring and/or tap driver body is constructed, is generally known as C300 metal.

One embodiment of this tapping attachment is able to provide some slight lateral movement of the tap to the hole while still providing a sufficiently accurate tap hole. The preferred embodiment of the invention, through the helical groove portion, provides approximately two one-thousandths ($^2/_{1000}$) of an inch of movement side to side at the end of the tap to allow for slight mis-alignment of the tap with the hole.

In a typical tapping application, the helical grooved area may provide for axial movement of up to thirty-one thousandths ($^{31}/_{1000}$) of an inch, even though the typical axial movement will only be in the two-one thousandths ($^2/_{1000}$) of an inch to five-one thousandths ($^5/_{1000}$) of an inch range. It is preferred that there be approximately thirty-one thousandths ($^{31}/_{1000}$) of an inch movement in response to approximately thirty (30) pounds of axial force, although the predetermined movement may be in response to any range of predetermined forces, all within the contemplation of this invention.

Although there are embodiments of this invention in which are not one piece or integral, it is preferred that the compression/tension area be integral or one piece with the tap driver body for concentricity and other reasons. Utilizing an embodiment of this invention wherein the tap driver body is one piece removes the reliance on the accurate assembly or fitting of two pieces together.

FIG. 2 further illustrates tap driver body axial aperture 11 through which cutting fluid or lubricant may be provided or routed for the tapping procedure. The guide bushing axial aperture 10 further provides the necessary conduit for the coolant to reach the collet chuck 12 and be provided to the tap hole during tapping, in accordance with known means by those of ordinary skill in the industry.

FIG. 2 further illustrates second drive pin 9 spaced apart from tap driver body 2 at least a distance equal to compression gap 17 to allow its movement. The first end 9a of second drive pin 9 is in the at least one drive pin aperture in the outer surface of the guide bushing 8 and a second end 9b of second drive pin 9 fits within aperture 20, which is better shown in FIG. 3 and is preferably oval shaped. Ball bearings 7 are provided in gaps above and below the helical coils 5 to maintain the first drive pin 6 and the second drive pin 9 in their respective locations, while still allowing relative axial and lateral movement. The first end 6a of first drive pin 6 is in the at least one drive pin aperture in the outer surface of the guide bushing 8 and a second end 6b of first drive pin 6 is in the at least one drive pin aperture 21 (better shown in FIG. 5) in the inner surface of the tap driver body 2.

O-rings 16 are shown between guide bushing 8 and tap driver body 2, the O-rings 16 providing a seal for containment and control of coolant injected into tap driver body axial aperture 11.

The tapping attachment further includes tap body sleeve 4 which generally surrounds the central portion 2b of tap driver body 2. FIG. 2 further shows collet nut 3 around the chuck portion 2c of tap driver body 2 for securing the tap into the chuck collet area 12. Also shown in FIG. 2 is shank flat 30 in the shank portion 2a of tap driver body 2, and tap 40. FIG. 2 further shows sliding ring 33 and tap square 34.

The term central portion as used herein in reference to the tap driver body is meant to include any area or portion of the tapping attachment between where the tap driver is held by the tapping machine, and where the tap is held by the tap driver.

FIG. 3 is an elevation view of the tap driver body 2, illustrating the shank portion 2a, central portion 2b and chuck portion 2c. Helical coils 5 are shown cut into central portion 2b and surrounded by first drive pin aperture 21 and second drive pin aperture 20. It will be noted that first drive pin aperture 21 provides a tight fit for first drive pin 6 to provide little or no relative movement between first drive pin 6 and tap driver body 2. On the other hand, second drive pin aperture 20 is intentionally larger than second drive pin 9 to allow for some relative movement, as is more fully illustrated in FIG. 2. Collet nut 3 is also shown around the chuck portion 2c of tap driver body 2.

Figure 4:
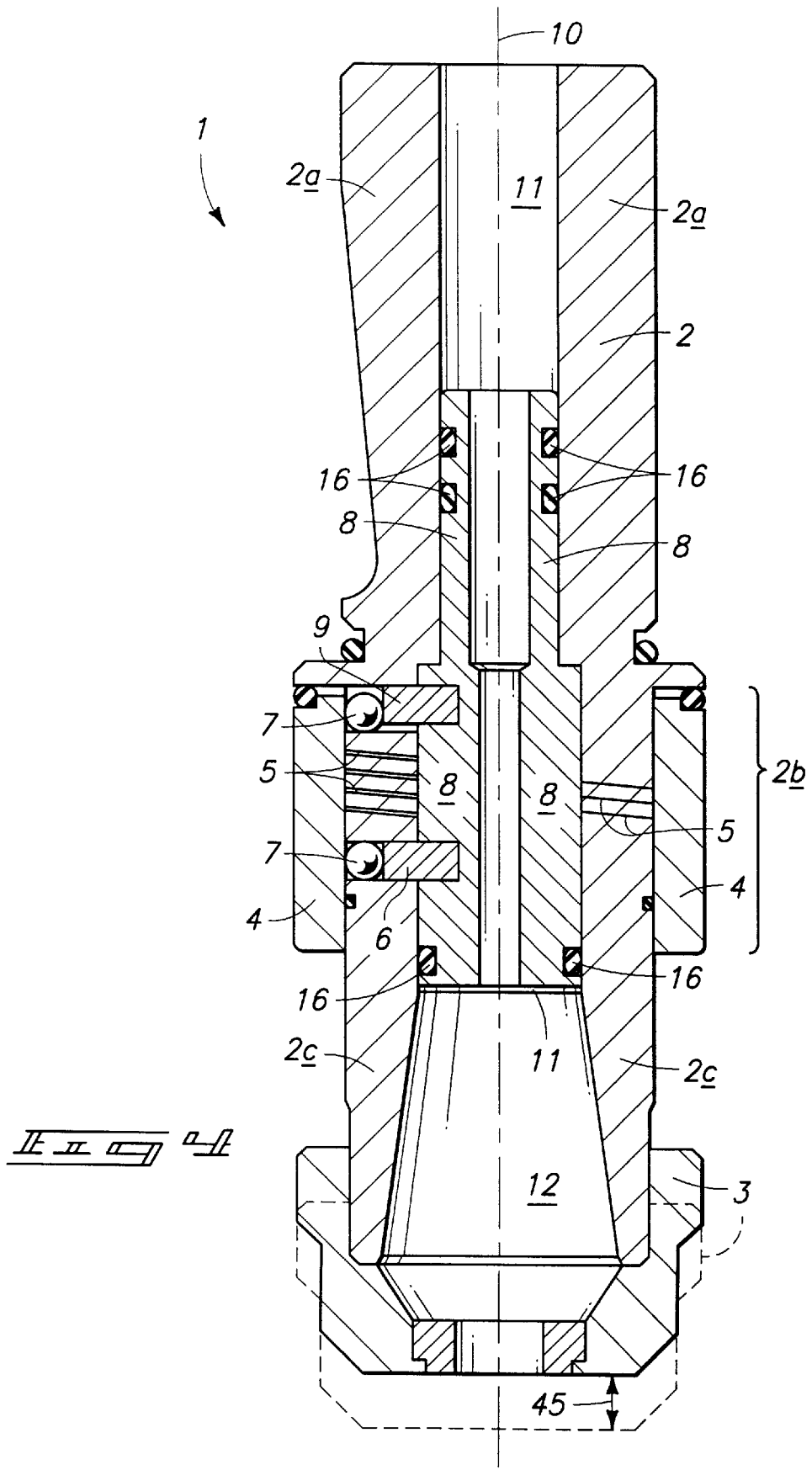
FIG. 4 is an elevation cross-sectional view of the embodiment of the invention shown in FIG. 1 but illustrating the compression flexure of the central portion of the tap driver body.

FIG. 4 is the same embodiment of the invention and view as shown in FIG. 2, with each item and element being identically numbered. FIG. 4 illustrates the axial or compression movement in the central portion 2b of the tap driver body 2 when forces are exerted on the tap driver body 2. FIG. 4 shows the helical portion being compressed and the compression gap 17 being fully closed (there is no gap in FIG. 4 as compared to FIG. 2).

FIG. 5 is a top cross-sectional view of a tapping attachment 1 contemplated in one embodiment of the invention, illustrating three first drive pins 6 as preferably offset one hundred twenty degrees from one another, ball bearings 7, central portion 2b of tapping attachment 2, tap body sleeve 4, guide bushing 8 and guide bushing axial aperture 10.

It will be appreciated by those of ordinary skill in the art that variations of three drive pins 6 and spacing or offsetting between drive pins 6 may be varied into any one of a number of different configurations and actual numbers of drive pins 6, all within the contemplation of this invention.

FIG. 6 is an elevation view of a tapping attachment 1 contemplated in one embodiment of the invention, and illustrates lateral flexure provided by an embodiment of this invention.

FIG. 6 shows tapping attachment 1, tap driver body 2, shank portion 2a of tap driver body 2, chuck portion 2c of tap driver body 2, tap 40, collet nut 3, tap body sleeve 4, and shank flat 30.

FIG. 6 further illustrates a slight lateral movement of the lower end of the tap 70, by a distance 71. The lateral movement of the lower end of tap 70 is generally provided by the central portion 2c of the tap driver body 2 and the grooves provided therein.

Distance 71 in FIG. 6 is exaggerated for illustration purposes, but generally may be one or two one-thousandths of an inch, which is generally an acceptable tolerance when machining tap holes. There may be a number of reasons this lateral flexure is needed. One example is if one machine is used to drill the tap start holes and a second machine is used to actually tap the whole, there may be some slight variances in the relative location of the intended drill holes versus tap hole.

FIG. 7 is an elevation view of another embodiment of a tap driver body 2 which may be used in connection with this invention, illustrating a honeycomb area 79 which provides the predetermined compression and tension for absorbing and providing axial forces, and which would also provide for a lateral flexure. The honeycomb or matrix configuration includes a plurality of first framework segments 80 and a plurality of second framework segments 81. The matrix area 79 may be calibrated to provide the desired predetermined axial compression and tension, as well as the predetermined lateral flexure.

FIG. 8 is an elevation partial view of a tap driver body 2, a shank portion 2a, and a shank flat 30. FIG. 8 illustrates another embodiment of this invention which provides the axial tension and compression, along with some lateral flexure.

FIG. 8 illustrates a dual flange area separated by a structure which provides the predetermined compression and tension for absorbing and providing the axial forces. First flange 74 is attached to shank portion 2a of the tap driver body 2, and second flange 73 is attached to the chuck portion of the tap driver body 2, with O-ring 75 sandwiched between the two. Tension pegs 76 provide rotational stability between the flanges and are attached to the first flange 74 and to the second flange 73. The tension pegs 76 have a predetermined spring tension factor which provides the desired axial tension flexure and the o-ring 75 provides the desired axial compression flexure. Any number of tension pegs 76 may be used within the contemplation of the invention.

Figure 9:
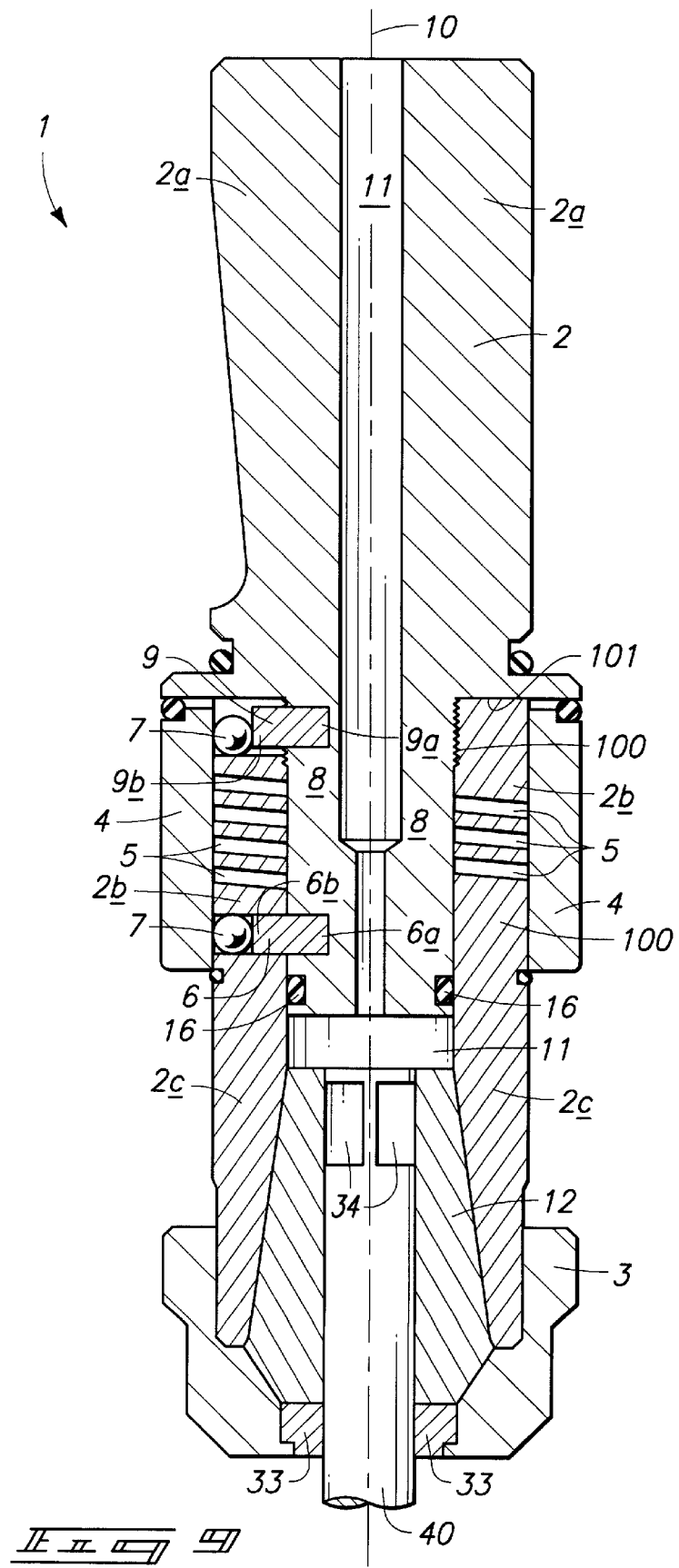
FIG. 9 is an elevation cross-sectional view of an embodiment of this invention showing a tap driver with a flexible area machined with helical coils between the shank portion and the chuck portion, and wherein the tap driver body is integral by being screwed together via a threaded joint.

FIG. 9 is an elevation cross-sectional view of an embodiment of this invention showing a tap driver with a flexible area machined with helical coils between the shank portion and the chuck portion, and wherein the tap driver body is integral by being screwed together via a threaded joint. FIG. 9 illustrates all the same components as from FIG. 2, with the variation that it specifically shown an embodiment in which the tap driver body is attached together so that it is integral, but is attached together by screwing the two portions or sections together. FIG. 9 shows mating threads 100 between the central body portion of and the shank portion, which operatively attach the two portions of the body together, as well as interface 101 between the respective portions of the tap driver body operatively attached together.

Constructing the tap driver body together in such a way allows different materials to be utilized for the compressible or central section, versus the shank and/or chuck portions. Economies can be achieved if the materials vary in cost, as well as other physical property benefits from a variation in material properties from one portion to another.

An embodiment of the invention therefore comprises a tap driver for rigid tapping, with a tap driver body comprising: a shank portion at a first end of the tap driver body, the shank portion configured to be secured to a tapping machine; a chuck portion at a second end of the tap driver; and a central body portion between the shank portion and the chuck portion, the central body portion having a predetermined axial compressibility in response to axial forces imparted on the tap driver during tapping.

In another embodiment of the invention, the central body portion between the shank portion and the chuck portion includes helical spring coils, the helical spring coils having a pre-determined compressibility for absorbing axial forces.

In yet another embodiment of the invention, the helical coils have a predetermined axial tension which allows a predetermined amount of expansion in response to axial tension forces imparted on the tap driver during tapping, in combination with the pre-determined compressibility and alone. In a further embodiment of the invention, the helical coils provide a predetermined lateral flexure in response to lateral forces imparted on the tap driver during tapping, to allow the tap itself to adapt or move slightly in the lateral direction, to create a tap hole.

In a process embodiment of the invention, a process for making a tap driver body for rigid tapping is provided, the process generally comprising the steps of providing a tap driver body comprising, the tap driver body comprising: a shank portion at a first end of the tap driver body, the shank portion configured to be secured to a tapping machine; a chuck portion at a second end of the tap driver; and a central body portion between the shank portion and the chuck portion; and machining a helical coil into the central body portion, the helical coil having a predetermined compressibility or expandibility.

During the tapping procedure, as the tap is driven into or out of the base material, typically metal, additional forces are placed on the tap which places the tap out of the desired synchronization. The central portion of the tap driver provided by this invention provides a compressibility and an expansion factor, which help compensate for these forces and provides the desired synchronization in tension and in compression.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A tap driver for rigid tapping, comprising:
   (a) a tap driver body comprising:
      (i) a shank portion at a first end of the tap driver body, the shank portion configured to be secured to a tapping machine, and further having shank threads thereon
      (ii) a chuck portion at a second end of the tap driver; and
      (iii) a central body portion between the shank portion and the chuck portion, the central body portion having a predetermined axial compressibility in response to forces imparted on the tap driver during tapping, and further including central body threads corresponding to the shank threads and disposed such that the shank portion may be operatively attached to the central body with the shank threads and the central body threads.

2. A tap driver for rigid tapping as recited in claim 1, and further wherein the central body portion has a predetermined axial expandability in response to forces imparted on the tap driver during tapping.

3. A tap driver for rigid tapping as recited in claim 2, and further wherein the central body portion has a predetermined lateral flexure in response to lateral forces imparted on the tap driver during tapping.

4. A tap driver for rigid tapping as recited in claim 1, and wherein the predetermined axial compressibility in the central body portion is provided by helical coils in the central body portion.

5. A tap driver for rigid tapping, comprising:
   (a) a tap driver body comprising:
      (i) a shank portion at a first end of the tap driver body, the shank portion configured to be secured to a tapping machine, and further having shank threads thereon;
      (ii) a chuck portion at a second end of the tap driver; and
      (iii) a central body portion between the shank portion and the chuck portion, the central body portion including helical spring coils, the helical spring coils having a pre-determined compressibility for absorbing forces, and further including central body threads corresponding to the shank threads and disposed such that the shank portion may be operatively attached to the central body with the shank threads and the central body threads.

6. A tap driver for rigid tapping as recited in claim 5, wherein the helical coils have a predetermined axial tension which allows a predetermined amount of expansion in response to axial forces imparted on the tap driver during tapping.

7. A tap driver for rigid tapping as recited in claim 6, and further wherein the helical coils provide a predetermined lateral flexure in response to lateral forces imparted on the tap driver during tapping.

8. A tap driver for rigid tapping, comprising:
   (a) a tap driver body with an outer surface and an axial inner aperture with an inner surface, the tap driver body comprising:
      (i) a shank portion at a first end of the tap driver body, the shank portion configured to be secured to a tapping machine, and further having shank threads thereon;
      (ii) a chuck portion at a second end of the tap driver;
      (iii) a central body portion between the shank portion and the chuck portion, the central body portion including helical spring coils, the helical spring coils having a pre-determined compressibility and a pre-determined expandability for absorbing axial forces, and further including central body threads corresponding to the shank threads and disposed such that the shank portion may be operatively attached to the central body with the shank threads and the central body threads;
      (iv) at least one drive pin aperture in the inner surface of the axial inner aperture of the tap driver body between the chuck portion and the helical coils;
   (b) a guide bushing comprising:
      (i) an outer surface which corresponds to the inner surface of the axial inner aperture of the tap driver body;
      (ii) a first bushing end and a second bushing end, the second bushing end being disposed to receive axial forces from a tap;
      (iii) at least one drive pin aperture in the outer surface of the guide bushing, said at least one drive pin aperture corresponding to the at least one drive pin aperture in the inner surface of the axial inner aperture of the tap driver body; and
   (c) a drive pin with a first end in the at least one drive pin aperture in the outer surface of the guide bushing and with a second end in the at least one drive pin aperture in the inner surface of the axial inner aperture of the tap driver body.

9. A tap driver for rigid tapping as recited in claim 8, and further wherein the helical coils provide a predetermined lateral flexure in response to lateral forces imparted on the tap driver during tapping.

10. A process for making a tap driver body for rigid tapping, comprising the following steps:
    (a) providing a tap driver body comprising:
       (i) a shank portion at a first end of the tap driver body, the shank portion configured to be secured to a tapping machine, and further having shank threads thereon;
       (ii) a chuck portion at a second end of the tap driver; and
       (iii) a central body portion between the shank portion and the chuck portion, and further including central body threads corresponding to the shank threads and disposed such that the shank portion may be operatively attached to the central body with the shank threads and the central body threads; and
    (b) machining a helical coil into the central body portion, the helical coil having a predetermined compressibility or expandibility.

* * * * *